United States Patent [19]
Riordan et al.

[11] Patent Number: 4,766,282
[45] Date of Patent: Aug. 23, 1988

[54] FUSING APPARATUS AND METHOD WITH ELECTRODE CHANGING

[75] Inventors: Edward D. Riordan, S. Somerville; Charles F. Szantho, Roselle Park, both of N.J.

[73] Assignee: Joyal Products, Inc., Linden, N.J.

[21] Appl. No.: 908,566

[22] Filed: Sep. 18, 1986

[51] Int. Cl.$^4$ ............................................. B23K 11/10
[52] U.S. Cl. ................................................ 219/86.25
[58] Field of Search ........................... 219/86.25, 86.8

[56] References Cited

U.S. PATENT DOCUMENTS

| | | | |
|---|---|---|---|
| 647,694 | 4/1900 | Burton | 219/86.8 |
| 3,263,059 | 7/1966 | Rzant | 219/56 |
| 3,313,909 | 4/1967 | Matthews | 219/86.8 |
| 3,452,177 | 6/1969 | Davis et al. | 219/86.8 |
| 3,781,981 | 1/1974 | Miura et al. | 219/87 |
| 4,025,750 | 5/1977 | Keizer et al. | 219/86.25 |
| 4,371,772 | 2/1983 | Szantho et al. | 219/86.51 |
| 4,451,722 | 5/1984 | Szantho et al. | 219/86.41 |
| 4,504,724 | 3/1985 | Szantho et al. | 219/86.25 |
| 4,510,370 | 4/1985 | Szantho et al. | 219/86.33 |

*Primary Examiner*—Clifford C. Shaw
*Attorney, Agent, or Firm*—Lerner, David, Littenberg, Krumholz & Mentlik

[57] ABSTRACT

Fusing apparatus is provided with a fusing electrode holder for holding one or more fusing electrodes defining a plurality of fusing contact regions. One fusing contact region is repeatedly engaged with successive workpieces, such as electric motor rotors, to fuse elements of each workpiece. The apparatus is provided with a shifting device for mechanically moving the fusing electrode holder to present a new fusing contact surface region, preferably after a predetermined number of cycles. Preferably, the ground electrode holder is also shifted to present a new ground contact region. Because the contact regions are renewed, productivity and quality will not be affected by electrode wear. The fusing electrode holder may be a rotatable turret having radial holes for receiving rod-like fusing electrodes, the turret being rotated to swing a new fusing electrode into position on each change cycle. The ground electrode holder may be arranged to hold a blade-like ground electrode having an elongated edge, the ground electrode holder being shifted to align a new region of this edge for contact with further workpieces.

11 Claims, 5 Drawing Sheets

FUSING APPARATUS AND METHOD WITH ELECTRODE CHANGING

BACKGROUND OF THE INVENTION

The present invention relates to fusing apparatus and methods.

As used in this disclosure, the term "fusing" refers to a technique for joining electrically-conductive elements of a workpiece in which a "fusing" electrode is contacted with one element adjacent the joint between the elements so that the fusing electrode forces the elements together. A "ground" electrode is also contacted with the workpiece, typically at a location remote from the joint, and electrical current is passed through the electrodes and workpiece. Heat generated by the electrical current, and the high pressure applied by the fusing electrode, causes a bond to form between the workpiece elements. The fusing electrode typically has higher resistivity than the workpiece elements, and ordinarily has a small contact surface region bearing on the workpiece. Thus, the major portion of the heat used in the process ordinarily is produced in the fusing electrode itself. Fusing techniques, also referred to as "hot staking" are used in a wide variety of industrial applications. For example, the windings and commutator bars of dynamoelectric machine rotors typically are joined to one another by fusing in mass production.

The productivity of fusing equipment and processes heretofore has been impaired by loss of productive time occasioned by electrode changes. As the electrodes are contacted with successive workpieces, the contact surfaces which engage the workpieces wear and deteriorate until the fusing action is impaired. Such wear and deterioration typically affect the fusing electrode more severely than the ground electrode, inasmuch as the fusing electrode ordinarily operates under more severe conditions of heat and load than the ground electrode. With the fusing equipment and methods utilized heretofore, the fusing process was interrupted whenever one or both of the electrodes became unacceptably worn. The fusing equipment remained idle for the time required to remove the worn electrode, replace it with a new electrode, and adjust the new electrode to the proper position in the equipment. Such interruptions in productivity of the fusing equipment have been particularly troublesome where the fusing process is integrated with other equipment in an automated production system, so tht interruptions in operation of the fusing apparatus can stop the entire production line. Also, wear and deterioration of the electrodes may cause unsatisfactory joining of the workpiece elements. Such defective joining can lead to waste of incoming parts, increased inspected and/or rework costs, and diminished outgoing product quality.

There have accordingly been needs heretofore for fusing equipment and methods which can provide continued, substantially uninterrupted productivity and consistent product quality despite electrode wear and deterioration. These needs have been particularly acute in fusing methods and apparatus for fusing the conductors and commutators of dynamoelectric machine rotors such as the rotors of small electric motors.

SUMMARY OF THE INVENTION

The present invention provides fusing apparatus and methods which meet those needs.

Fusing apparatus according to one aspect of the present invention includes fusing electrode holder means and ground electrode holder means for holding fusing and ground electrodes defining fusing and ground contact regions, respectively. At least one of the fusing and ground electrode holder means is a multicontact electrode holder means operative to hold at least one electrode defining a plurality of contact regions. Thus, the multicontact electrode holder means may be arranged to hold one electrode defining a plurality of contact regions, or may be arranged to hold plural electrodes, each defining one contact region. Preferably, both the fusing and ground electrode holder means are multicontact electrode holder means.

Electrode positioning means are provided for positioning each of the electrode holder means so that one fusing contact region is presented in a workpiece-engaging disposition and one ground contact region is also presented in workpiece-engaging disposition. The apparatus preferably includes engagement means for repetitively engaging the contact regions which are in workpiece-engaging disposition with successive workpieces. The apparatus may also be provided with power means for applying an electrical potential between the contact regions engaged with each workpiece to thereby direct an electrical current through the electrodes and join elements of the workpiece to one another.

The apparatus also preferably includes electrode change means for mechanically moving each multicontact electrode holder means so as to present a new contact region in workpiece-engaging disposition. Where the fusing electrode holder means is a multicontact electrode holder means, operative to hold at least one fusing electrode defining a plurality of fusing contact regions, the electrode change means can include fusing electrode shift means for moving the fusing electrode holder means to present a new fusing contact region in workpiece-engaging disposition. Upon actuation of the fusing electrode shift means, the worn or deteriorated fusing contact surface region is replaced and the apparatus is accordingly maintained in operating condition, with substantially no loss of productive capacity. Typically, the ground electrode or electrodes also define plural contact regions, and the electrode change means includes means for moving the ground electrode holder as well as the fusing electrode holder.

The apparatus may also include control means for automatically actuating the electrode change means before deterioration of the electrode contact surfaces interferes with the joining process. Preferably, the control means includes means for counting the number of times a contact surface region in workpiece-engaging disposition has been engaged with workpieces and actuating the electrode change means when the count reaches a predetermined limit. The predetermined limit preferably is selected so that it is less than the number of satisfactory cycles expected for each contact region. Separate limits and separate counts may be maintained for the fusing and ground contact regions. Thus, one or both contact regions are automatically replaced before wear or deterioration of the contact surface regions produces unsatisfactory fusion. The present apparatus thus provides improvement in product quality.

The multicontact electrode holder means may include a turret having a turret axis and means for retaining one or more electrodes on the turret so that contact regions defined by the electrode or electrodes on the turret are disposed at spaced-apart locations around the turret axis. The engagement means may include means for moving the turret axis in a predetermined direction towards each workpiece, and the electrode positioning means may include turret arrest means for locking the turret against rotation so that one of the contact regions protrudes in that predetermined direction relative to the axis. The contact region protruding in the predetermined direction, towards the workpieces will be in workpiece-engaging disposition. The electrode change means may include means for releasing the turret arrest means and turret rotation means for rotating the turret about the turret axis so as to swing a new contact region into workpiece engaging disposition.

Alternatively, a multicontact electrode holder means may include blade holder means for holding a blade-like electrode, having an elongated edge. The electrode change means may include means for moving the blade holder means lengthwise with respect to the edge, so as to present a new region of the edge in workpiece-engaging disposition. In one preferred arrangement, the fusing electrode holder means includes a turret adapted to hold a plurality of rod-like fusing electrodes, each extending generally radially with respect to the turret axis, whereas the ground electrode holder means includes a blade holder means. The apparatus preferably may include a base, a carriage movably mounted to the base and carriage drive means for moving the carriage upwardly and downwardly. The turret may be mounted to the carriage for rotation relative thereto about the turret axis, and the turret axis may be disposed substantially horizontally so that the electrode in workpiece-engaging disposition protrudes downwardly of the turret axis. The engagemment means may include workpiece fixing means for fixing each workpiece to the base beneath the turret axis.

In one embodiment, suitable for fusing conductors of dynamoelectric machine rotors to the associated commutator bars, the fusing electrodes are disposed adjacent a forward edge of the carriage. This arrangement prevents interference between the carriage and the windings and associated elements of the rotor as the carriage descends to engage the fusing electrode in workpiece-engaging disposition with the rotor at the juncture between a winding conductor and a commutator bar. The blade holder means may be operative to hold the blade-like ground electrode so that the edge extends laterally with respect to the base, and the engagement means may include means for fixing workpieces, such as dynamoelectric machine rotors, each of which is substantially in the form of a body of revolution about an axis, to the base so that the axis of each workpiece is disposed beneath the edge of the ground electrode and the axis of each workpiece extends generally forwardly and rearwardly along a predetermined line. The workpiece engagement means may also include means for moving the ground electrode downwardly relative to the base to contact the workpiece. Thus, the particular region of the ground electrode edge which is laterally aligned with the predetermined line, and hence with the axis of each workpiece, will contact the workpiece as the ground electrode holder means is moved downwardly. The electrode change means preferably includes means for moving the ground electrode holder means laterally relative to the base and hence lengthwise with respect to the edge so as to align a new region of the edge with the predetermined line and hence bring a new ground contact region into workpiece-engaging disposition.

In other embodiments, the engagement means may be arranged to move the electrode holder means in other ways during engagement with the workpieces. For example, in one arrangement where both the fusing electrode holder means and the ground electrode holder means include turrets, the axis of one turret may be arranged vertically and the engagement means may move this turret forwardly with respect to the base to contact the workpiece.

A further aspect of the present invention includes a method of fusing comprising the steps of simultaneously contacting each workpiece in a series of workpieces with a fusing contact region defined by fusing electrode-defining means and with a ground contact region defined by ground electrode-defining means. A potential is applied between the engaged contact regions to fuse elements of the workpiece to one another. In the method according to the present invention, at least one of the electrode-defining means is mechanically moved so as to present a new contact region for engagement with subsequent workpieces in the contacting step. Preferably, the moving step includes the step of shifting both the fusing and ground electrode-defining means to present both a new fusing contact region and a new ground contact region. The fusing and ground electrode-defining means may be shifted either simultaneously or at different intervals depending upon the rate of wear and the expected number of satisfactory workpiece contacting cycles for the two different electrode means. Thus, where the number of workpiece-counting cycles is counted and compared with a predetermined limit to initiate the electrode moving operation when the count reaches a predetermined limit, different limits may be applied with respect to the fusing and ground electrode means. Typically, the limit for the fusing electrode-defining means will be lower than the limit for the ground electrode-defining means.

Fusing methods according to this aspect of the present invention provide increased productivity, as the operation need not be substantially interrupted to change electrodes, and can also provide increased reliability and product quality because the electrode contact surfaces can be automatically changed before wear interferes with the process.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
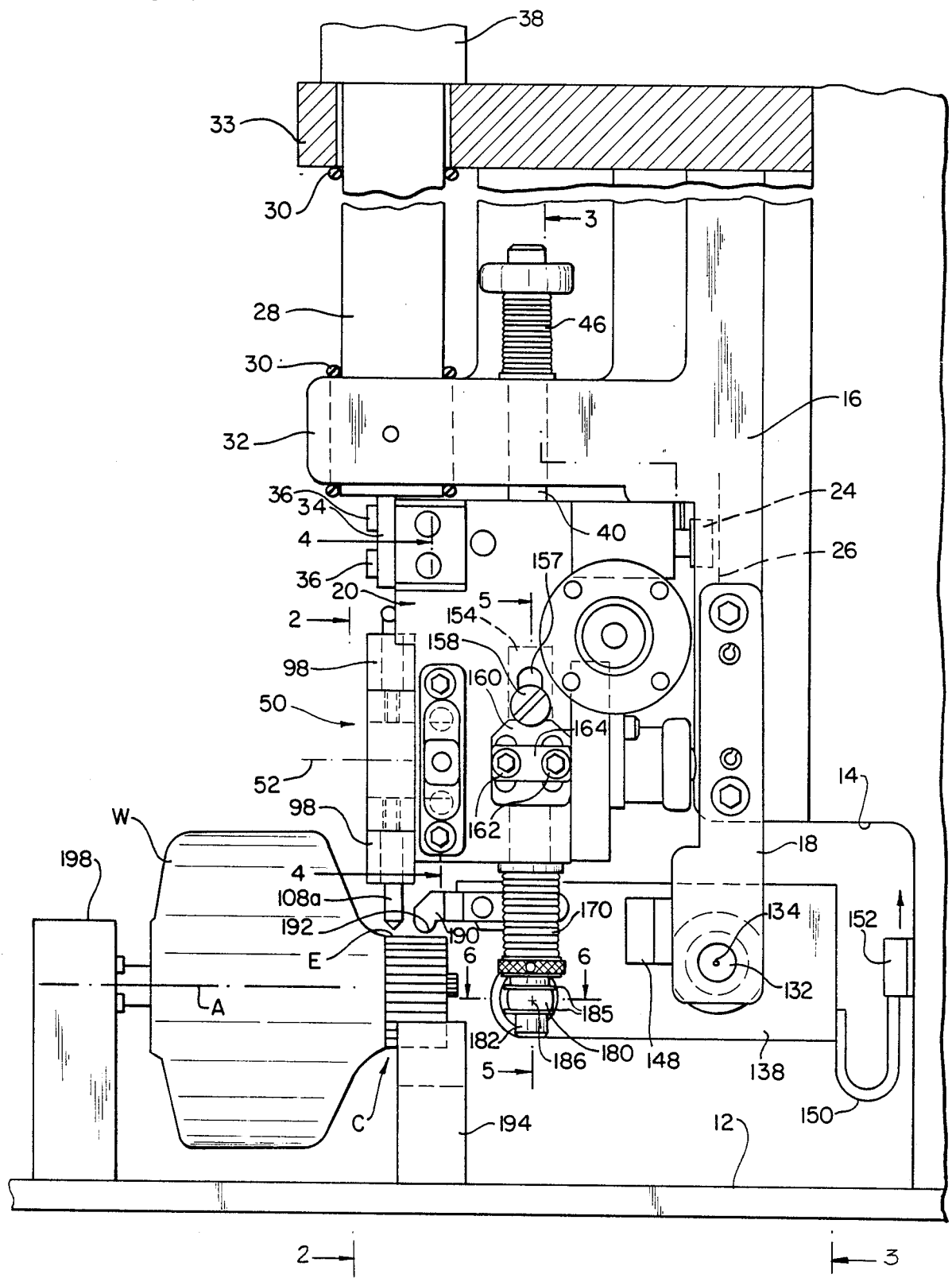
FIG. 1 is a schematic elevational view of apparatus according to one embodiment of the present invention, in conjunction with electrodes and a workpiece.

Apparatus according to a preferred embodiment of the present invention includes a base 10 having a plate 12, a support column 14 extending upwardly from the base plate and a slide 16 mounted to the column and securd in place by a conventional dovetail and gibs (not shown). The base also includes a pair of arms 18 and 19 (FIG. 3) extending downwardly from slide 16 on laterally opposite sides thereof.

A carriage 20 is mounted to slide 16 for upward and downward movement relative to the base, the carriage being constrained against lateral motion by roller 24, which is engaged in a corresponding slot 26 in slide 16. A cylinder rod 28 is mounted to the base for vertical movement by bushings 30 disposed in arms 32 and 33 formed integrally with the slide. The lower end of cylinder rod 28 is connected by a plate 34 and bolts 36 to the front face of carriage 20. The upper end of cylinder rod 28 is connected to a pneumatic drive cylinder 38, so that the cylinder can move the carriage upwardly and downwardly. Lift rods 40 and 42 (FIG. 3) are threadedly engaged with the top surface of the carriage and pass through holes in the lower arm 32. The upper ends of lift rods 40 and 42 are surrounded by compression springs 46 which in turn bear on nuts 48 threadedly engaged with the lift rods.

A turret 50 having a turret axis 52 is mounted to the carriage so that the turret axis 52 extends substantially forwardly and rearwardly, and hence horizontally, through carriage 20. Turret 50 includes a body portion 54 having a cylindrical surface 56. Body portion 54 is received in a bore 58 (FIG. 4) in carriage 20. A pair of conductive metal brushes 60 and 62 are received in slots 64 and 66, respectively, in the carriage 20. The brushes are biased into engagement with surface 56 of the turret by springs 68. Springs 68 are retained by plates 70 and 72, respectively, which are bolted to the carriage on laterally opposite sides thereof. Brush 60 has a boss 74 extending through a hole in the associated plate 70. Boss 74 is connected via a flexible fusing connector 76 to a block 78 (FIG. 2) mounted to the plate 12 of the base, the block 78 being electrically connected to a conventional potential source as commonly employed with fusing equipment. The opposite brush 62 has a projection 80 which is connected to a further source block (not shown), also mounted to the base plate 12 by a similar flexible fusing conductor 82.

Five pin-receiving holes 84 (FIG. 4) extend substantially radially inwardly in turret body 54 from surface 56 towards turret axis 52, each such pin-receiving hole being provided with a hardened, wear resistant bushing 86. A pin 90 is slideably mounted in a hole 92 in carriage 20 so that the pin extends substantially radially with respect to turret axis 52. A piston 94 attached to pin 90 is received in a cylinder bore 96 in carriage 20, this bore being closed by a plate at the surface of the carriage. Appropriate passageways (not shown) are provided for conducting air into and out of cylinder bore 96 on both sides of piston 94 so as to move the piston and hence move pin 92 into and out of engagement with the hole 84 which is aligned with the pin. Engagement of pin 90 in any of holes 84 will arrest rotation of the entire turret 50 about turret axis 52.

Figure 2:
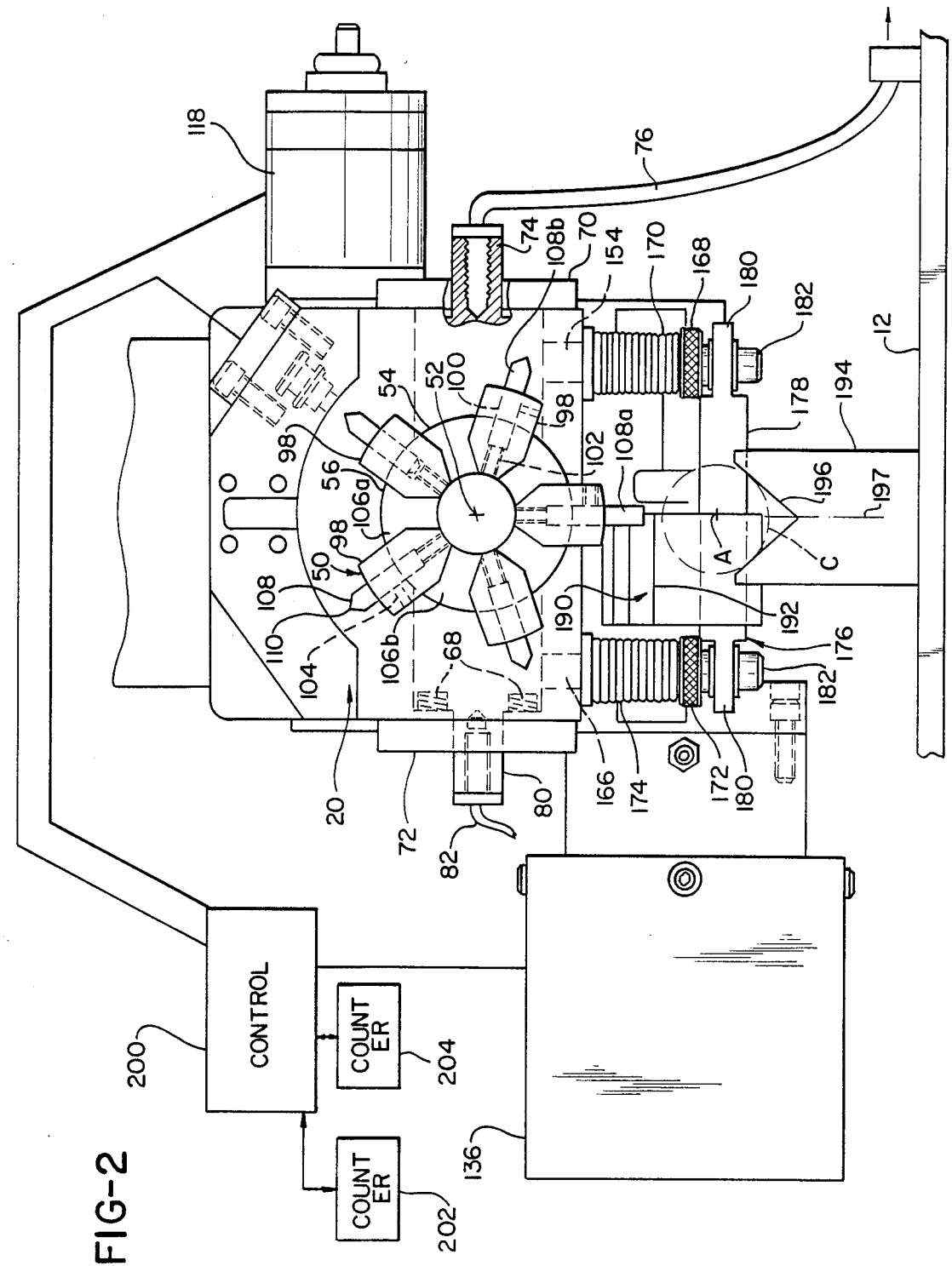
FIG. 2 is a view taken along line 2—2 in FIG. 1.

The turret 50 also includes five lobes 98 at the forward end of the turret. These lobes are disposed at equal spacings around axis 52. Each lobe has an electrode-receiving hole 100. The electrode-receiving holes extend radially with respect to the turret axis and all of these holes extend in a common vertical plane. Each electrode-receiving hole 100 is provided with an electrode-adjusting screw bore 102 extending radially inwardly, towards axis 52 from the electrode-receiving hole. Each electrode-receiving bore 100 is also provided with a set screw bore 104 extending transversely to the electrode-receiving bore. An electrode adjusting screw is threadedly engaged in each adjusting screw bore 102, whereas a set screw is threadedly engaged in each set screw bore 104. As best seen in FIG. 2, the lobes 98 define slots or access openings 106 therebetween. The number of access openings is equal to the number of electrode-receiving bores and hence equal to the number of adjusting screw bores 102. Each access opening 106 is disclosed diametrically opposite to one of the adjusting screw bores 102. An elongated, rodlike fusing electrode 108 is received in each of electrode-receiving bores 100, so that each such electrode extends generally radially with respect to turret axis 52. Each fusing electrode 108 has a tip 110 at the end of the electrode remote from the turret axis 52. Each such tip defines one fusing contact region.

Figure 3:
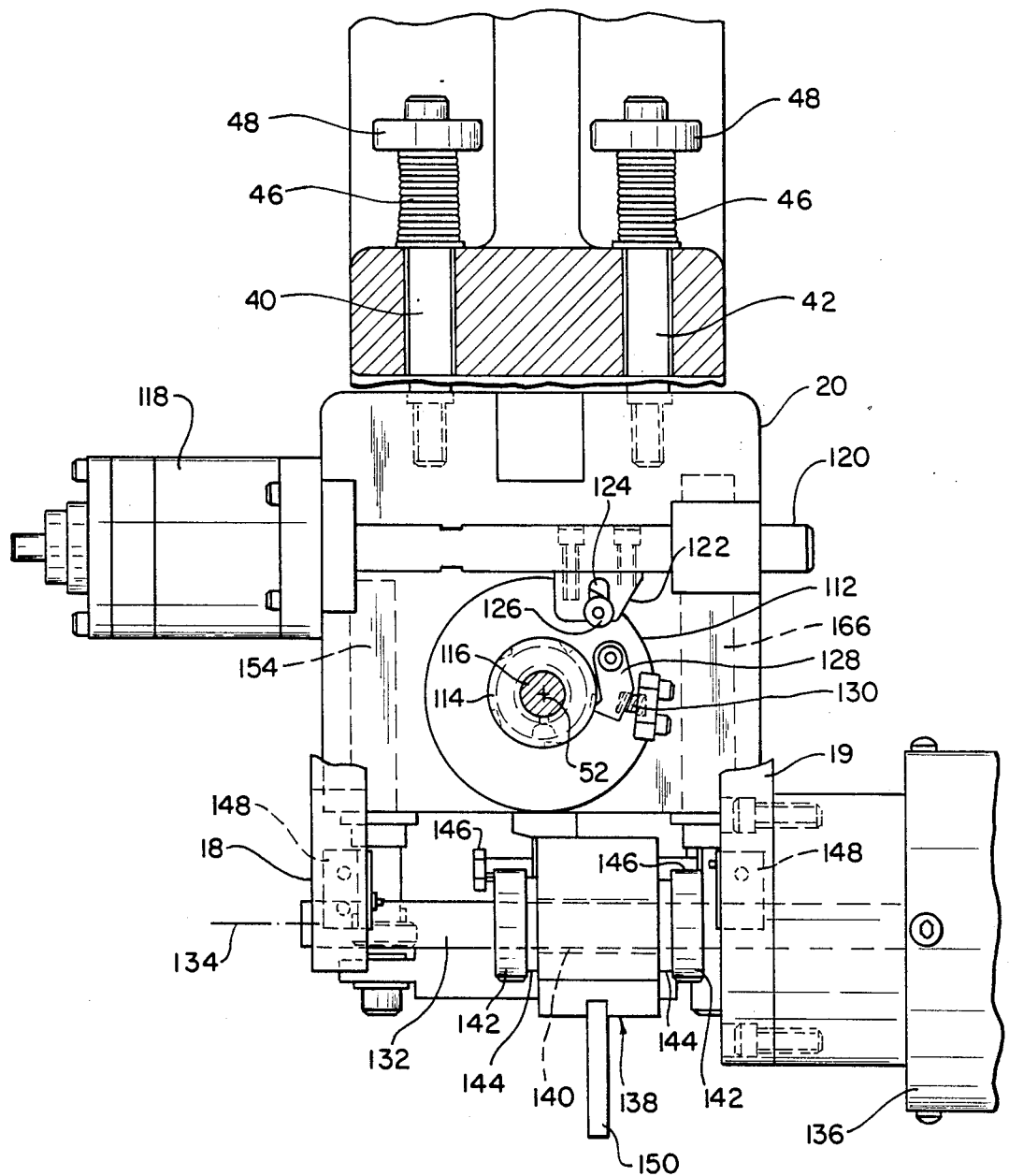
FIG. 3 is a view taken along line 3—3 in FIG. 1.

A coupling member 112 (FIG. 3) is mounted on a rearward extension of turret body portion 54, adjacent the rear face of carriage 20 the coupling member being rotatable about turret axis 52 with respect to the turret body portion. A ratchet 114 is mounted adjacent coupling 112 and fixed to a rearward extension 116 of turret body portion 56 so that the ratchet is connected to the turret for rotation therewith about turret axis 52. A turret rotation actuator 118 is mounted to carriage 20 and connected to a turret drive rod 120, which in turn is slideably mounted to the carriage 20 for lateral movement with respect thereto. Turret drive rod 120 is provided with a clevis 122 having a downwardly facing slot 124. A pin 126 projecting from coupling member 112 is received in slot 124, so that lateral movement of turret actuator rod 120 from the rest position shown to a displaced position in which fork member 122 is adjacent actuator 118 will swing coupling member 112 about turret axis 52, in the counter clockwise direction as seen in FIG. 3, through an arc of about 72°, whereas the return motion of clevis 122 back to the rest position illustrated will swing the coupling member back through the same arc in the opposite direction. A pawl 128 is pivotally mounted on coupling member 112 and biased by spring 130 to engagement with the teeth of ratchet 114. The ratchet and pawl serve as a one-way clutch, for linking the coupling member to the turret for rotation therewith about axis 52 when the coupling member is rotated in the counter clockwise direction as seen in FIG. 3, but for allowing the coupling member to rotate freely with respect to the turret when the coupling member is rotated in the opposite direction. Thus, by operation of actuator 118, the coupling member and the turret can be rotated stepwise in the counter clockwise direction as seen in FIG. 3, which is the clockwise direction as seen in FIG. 2.

A push rod 132 (FIG. 3) is slidably mounted to the arms 18 and 19 of the base so that the push rod extends laterally with respect the base and the axis of the rod is coincident with a laterally extensive base pivot axis 134. A linear actuator 136 is connected to push rod 132 for sliding the push rod laterally, to the left and right as seen in FIG. 3. Ground electrode support 138 is mounted on push rod 132, the push rod being received in an electrically insulated bushing 140 which in turn is received in a hole extending laterally through the ground electrode support. A pair of collars 142 are fixed to push rod 132 on opposite sides of ground electrode support 138, and electrically insulating washers 144 are disposed between the collars and the sides of the ground electrode support. Thus, although the ground electrode support 138 is free to pivot about the push rod and hence is free to pivot about base pivot axis 134, and although the ground electrode support 138 is electrically insulated from push rod 132, the ground electrode support is connected to the push rod for lateral movement therewith under the influence of actuator 136. Bolts 146 protrude from laterally opposite sides of ground electrode support 138 in alignment with sensor switches 148, so that at each end of the stroke of the push rod, one of bolts 146 will trip the associated switch 148 to provide an end of stroke signal. A flexible ground connector 150 is connected to a block 152 (FIG. 1) which in turn is connected to a potential generator (not shown), so that the block 152 can serve as a source of ground potential. Block 152 is affixed to the base 10 but electrically insulated therefrom.

Figure 5:
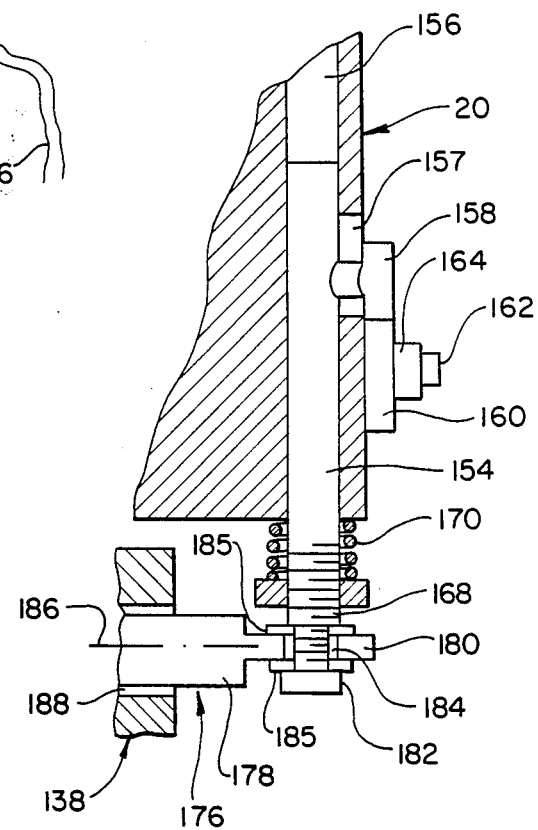

A link 154 is slidably mounted to carriage 20 adjacent the left-hand side of the carriage as seen in FIG. 3. As best illustrated in FIG. 1, link 154 is disposed forwardly of base pivot axis 134, i.e., to the left of axis 134 as seen in FIG. 1. Link 154 is received in a vertical hole 156 (FIG. 5) in carriage 20, so that the link is movable upwardly and downwardly with respect to the carriage. A stop screw 158 extends transversely to the link through a slot 157 in the adjacent lateral face of the carriage. A stop plate 160 is mounted to the sidewall of the carriage by bolts 162 and washer plate 164. As bolts 162 pass through elongated slots in the stop plate 160, the position of the stop plate can be adjusted upwardly and downwardly along the wall of carriage 20. Stop bolt 158 engages block 160 to limit the downward motion of link 154 in hole 156. A second link 166 (FIGS. 2 and 3) is slidably mounted for upward and downward movement adjacent the side of carriage 20 opposite from link 154, link 166 being constrained for upward and downward movement over a limited range of motion by a similar stop block arrangement (not shown).

Figure 6:
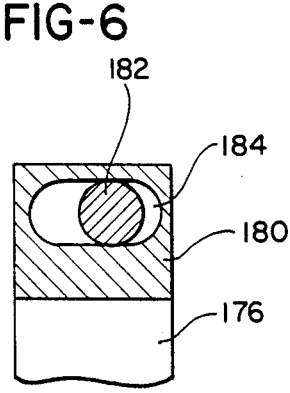

A collar 168 is threadedly engaged with the lower end of link 154, and a helical compression spring 170 is interposed between collar 168 and the lower face of carriage 20, so that the compression spring biases link 154 downwardly relative to the carriage. A similar collar 172 and compression spring 174 are provided on link 166 (FIG. 2). A link cross shaft 176 having a cylindrical central portion 178 and two flattened ends 180 is mounted to the lower ends of links 154 and 166 by bolts 182 passing through slots 184 in the flattened ends 180. As seen in FIG. 6, slots 184 are elongated slightly forwardly and rearwardly so that link cross shaft 176 can move slightly forwardly and rearwardly with respect to the links. Washers 185 are interposed between the heads of screws 182 and flattened ends 180 of the link cross shaft and between the flattened ends and the lower ends of links 154 and 166 to permit this minor forward and rearward sliding movement of the link cross shaft to occur without loosening of screws 182.

The cylindrical portion 178 of the link cross shaft defines a laterally-extensive link pivot axis 186. Cylindrical portion 178 is received in an electrically insulating bushing 188 which in turn is received in a hole within ground electrode support 138, so that the ground electrode support is free to slide laterally with respect to the link cross shaft and the ground electrode support is also free to pivot about link pivot axis 186.

A blade-like ground electrode 190 is releasably mounted to ground electrode support 138 at the forward end thereof. Ground electrode 190 has an elongated edge 192. As best seen in FIG. 2, edge 192 faces downwardly and extends laterally when the electrode is mounted on support 138. Edge 192 is disposed slightly to the rear of the fusing electrodes 108. A vee block 194 is mounted to plate 12 of the base so that the V-shaped slot 196 in the block extends forwardly and rearwardly. The central plane 197 defined by the V-shaped slot, i.e., the vertical plane bisecting the slot and passing through the vertex of the V, is laterally aligned with turret axis 52. Thus, the V-shaped slot extends forwardly and rearwardly beneath the turret axis. In the position illustrated in the drawings, the right-hand portion of ground electrode edge 192 is laterally aligned with the turret axis and with the central plane 197 of V-shaped slot 196 whereas other regions of the ground electrode edge, to the left in FIG. 2, are out of alignment with the central plane.

A workpiece rotator 198 (FIG. 1) is also mounted to the base plate, and provided with conventional means for engaging a workpiece having an axis and rotating the workpiece stepwise about such axis. An electropneumatic control apparatus 200 is also provided, the control apparatus being linked to linear actuator 136, turret rotation actuator 188, turret arrest cylinder 96 and drive cylinder 38. The control apparatus is also linked to the workpiece rotator 198 and to the conventional potential generator which supplies potential to blocks 152 and 78, and hence to the ground and fusing electrodes. The control apparatus is provided with counters 202 and 204, each of which is arranged to keep a running count in response to signals from control unit 200 and to provide a signal to the control unit when the count exceeds a predetermined total stored within the particular counter. Appropriate cooling water channels (not shown) are formed in carriage 20 and in ground electrode support 138. The cooling water channels are supplied with water by flexible hoses extending from the base to the carriage and to the ground electrode support.

In one process according to the present invention, a workpiece W which is a dynamoelectric machine rotor is engaged by workpiece rotator 198 and supported by vee-block 194. The workpiece or rotor has a workpiece axis A and a commutator section C generally in a form of surface of revolution about axis A. Commutator section C has a large number of commutator bars disposed about the axis A. The ends E of electrical windings on the rotor are disposed adjacent appropriate commutator bars, and each end E must be fused to the appropriate commutator bar. As best seen in FIG. 2, the V-shaped slot 196 positions the commutator so that the workpiece axis A extends forwardly and rearwardly in central plane 197. As plane 197 is laterally aligned with turret axis 52 and with the fusing electrode 108a in workpiece-engaging disposition, the workpiece axis A is also laterally aligned with turret axis 52 and with fusing electrode 108a. The workpiece axis is also laterally aligned with that region of ground electrode edge 192 disposed in workpiece-engaging disposition at plane 197.

Control apparatus 200 actuates cylinder 38 to force carriage 20 downwardly. As the carriage moves downwardly, links 154 and 166, and hence link cross shaft 176 move downwardly as well. Ground electrode support 138 pivots about base pivot axis 134 as the forward portion of the ground electrode support moves downwardly along with link cross shaft 176. To accommodate this pivoting action, the link cross shaft slide slightly rearwardly with respect to tlinks 154 and 156, within the small range of forward and rearward motion provided by elongated slots 184 (FIG. 6) so as to maintain the link pivot axis 186 at a constant radial distance from base pivot axis 134.

With continued downward travel of the carriage, the region of ground electrode edge 192 aligned with central plane 197 engages the commutator bar disposed at the top of the commutator on the central plane and establishes electrical contact therewith. Engagement of the ground electrode with the commutator arrests the pivoting movement of the ground electrode support and hence arrests downward movement of the link cross shaft 176 and links 154 and 166. With continued downward movement of carriage 20, springs 170 and 174 are compressed so as to urge the ground electrode into firm engagement with the commutator bar. Lifing springs 46 are also compressed during downward motion of carriage 20. As the carriage 20 moves further downwardly, the tip of fusing electrode 108a engages the wire end E positioned on the central plane and forces that end into firm engagement with the same commutator bar engaged by the ground electrode.

The electrical potential applied between the ground electrode and the fusing electrode causes an electrical current to flow between these electrodes, through the engaged wire end and commutator bar. The heat created by the flowing current in the fusing electrode and at the junction between the wire end and commutator bar, and the pressure applied by the fusing electrode causes the wire end to fuse with the commutator bar. Because cylinder rod 28 is substantially aligned with fusing electrode 108a, the line of action of the force applied by cylinder 38 passes through or adjacent to the tip of fusing electrode 108a. Thus, the downward force applied by the cylinder is substantiall aligned with the opposing upward force applied through the electrode tip through the carriage by the workpiece. Substantial downward forces may be applied by cylinder 38 without applying any appreciable turning or twisting moment to the carriage, and hence without applying any appreciable stress to the roller 24 used to guide the carriage in a downward movement relative to the base.

The control means maintains the fusing and ground electrodes in contact with the workpiece for a time sufficient to complete the fusion and then causes cylinder 38 to exert an upward force, thereby to retract the carriage upwardly. The upward movement of the carriage is assisted by lifting springs 46 and rods 42. As the carriage moves upwardly, the fusing electrode loses contact promptly. However, the ground electrode maintains contact during the initial upward motion of the carriage, as link cross shaft 176 and links 154 and 166 move downwardly relative to the carriage under the influence of springs 170 and 174. The downward movement of the links and link cross shaft relative to carriage 20 is arrested when link stop screw 158 engages stop 160, whereupon the links and link cross shaft move upwardly with the carriage, lifting the forward portion of ground electrode support 138. The ground electrode support then pivots clockwise as seen in FIG. 1 about base pivot axis 134, moving ground electrode 190 and hence ground electrode edge 192 upwardly relative to the base and upwardly away from the workpiece. As the link cross shaft moves upwardly relative to the base during this phase of operation, the link cross shaft slides forwardly relative to the links and relative to bolts 182 in the range of motion provided by slots 184. Thus, the apparatus is restored to its original starting position.

While the electrodes are clear of the workpiece, control apparatus 200 instructs workpiece rotator 198 to turn the workpiece or rotor W about axis A and hence bring a new commutator bar and wire end to the top and into alignment with central plane 197, whereupon the cycle of operations described above is repeated. After all the commutator bars on the workpiece have been fused with the associated wire ends, that workpiece is removed and replaced by a new workpiece, and the cycle is resumed.

Each time the control apparatus moves the carriage downwardly to engage the electrodes with a workpiece, it increments counters 202 and 204, so as to keep a running count of the number of times the electrodes have been engaged with workpieces in the continuing stream of production. Counter 202 is used to maintain a count of engagements for the fusing electrode, whereas counter 204 is used to maintain a count of engagements for the ground electrode. Each counter is set with a predetermined limit. As the stresses and wear on the fusing electrode typically are more severe than those applied to the ground electrode, counter 202 is typically set to a lower predetermined limit than counter 204. When the fusing electrode engagement count kept by counter 202 reaches the predetermined fusing electrode count limit, counter 202 signals control means 200 to initiate a fusing electrode change cycle.

Figure 4:
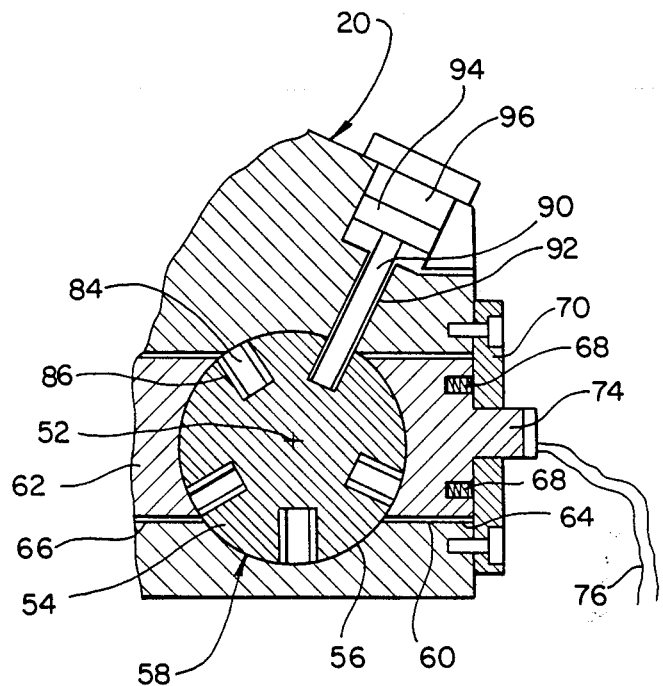
FIGS. 4, 5 and 6 are fragmentary sectional views taken along lines 4—4, 5—5 and 6—6, respectively, in FIG. 1.

When such a fusing electrode change cycle signal is received, the control means provides an appropriate pneumatic signal to cylinder 96 to move piston 94 upwardly as seen in FIG. 4 and hence withdraw pin 90 from hole 84 in the turret body, thereby freeing the turret for rotation about turret axis 52. The control means then actuates turret rotation actuator 118 to pull rod 120 and clevis 122 to the left as seen in FIG. 3 and hence rotate coupling 112 counterclockwise, also as seen in FIG. 3. Pawl 128 engages ratchet 114 and turns the ratchet counterclockwise as seen in FIG. 3, thereby swinging the turret about turret axis 52 to move electrode 108a out of workpiece engaging disposition and move electrode 108b into workpiece engaging disposition, with electrode 108b pointing downwardly with respect to the turret axis and aligned with central plane 197. When electrode 108b is in this workpiece-engaging disposition, another hole 84 (FIG. 4) in turret body 54 is aligned with rod 90. The control means actuates cylinder 96 to advance piston 54 and hence rod 90 inwardly toward turret axis 52 and engage the pin in this new hole 84, thereby locking the turret against further rotation. Turret rotation actuator 118 is operated to move rod 120 and clevis 122 back to the right as seen in FIG. 3, to the position illustrated in that figure, and hence rotate coupling member 112 and pawl 128 clockwise as seen in FIG. 3 about turret axis 52. Because the pawl rides over ratchet 114, this rotation of the coupling member is not transmitted to the turret. Brushes 60 and 62 maintain electrical contact with the turret body as the turret body is rotated, and hence provide fusing potential to the newly-positioned fusing electrode 108b.

The turret is rotated to move a new fusing electrode into position while the fusing electrodes are out of engagement with the workpiece, typically while the carriage 20 is in its upward or retracted position. Typically the time required to move a new fusing electrode into position is negligible and does not cause any appreciable delay in repetition of the fusing cycles. When a new fusing electrode has been moved into position, the control means reinitializes the fusing electrode engagement count kept by count 202, so that such count starts again from zero.

Control means 200 also increments the ground electrode engagement count kept by counter 204 each time the electrodes are engaged with the workpiece. When the ground electrode engagement count reaches the predetermined ground electrode engagement limit kept by counter 204, the control means operates linear actuator 136 to move push rod 132 and hence bushings 142 and ground electrode support 138 to the left as seen in FIG. 3, thereby moving ground electrode 190 to the right as seen in FIG. 2 by a predetermined incremental distance. This displacement of the ground electrode, laterally with respect to the base and lengthwise along the length of edge 192, aligns a new region of edge 192 with central plane 197 and hence moves new region of the ground electrode edge into workpiece engaging disposition. The ground electrode support slides laterally relative to the base upon the lateral movement of push rod 132 relative to the base. Lateral movement of the ground electrode support is accommodated by the slidable engagement of bushing 188 (FIG. 5) with the link cross shaft, which permits the ground electrode support to slide in the lateral direction, along the link cross shaft and hence along link pivot axis 186. As the ground electrode support moves laterally, ground electrode connector 150 deforms slightly to accommodate this motion. Once a new region of the ground electrode edge 192 has been presented in workpiece engaging disposition, the cyclic upward and downward movement of the carriage is resumed to continue further fusing operations, and the ground electrode engagement count kept by counter 204 is reinitialized at 0.

The sequential operations continue until all the available electrode surfaces have been utilized, viz, until all of the fusing electrodes 108 have been used or until all regions along the length of the ground electrode 192 have been employed, whichever first occurs, whereupon the fusing electrodes, ground electrode or both are removed and replaced by new pieces. When the ground electrode has been displaced through its entire range of travel, bolt 146 will trip switch 148 on the left-hand side of the apparatus, as seen in FIG. 3, thereby indicating to the control means that no further movement of the ground electrode support can be accommodated.

All of the fusing electrodes typically are set to the desired position when the turret is reloaded with fresh fusing electrodes. The turret design discussed above greatly facilitates setting each electrode to the proper position, so that the tip of each electrode is disposed at the same distance from the turret axis 52. Because openings 106 are disposed diametrically opposite threaded holes 102 and hence diametrically opposite to the screws engaged in those holes, a tool such as an Allen wrench can be passed through each opening to engage the opposite threaded screw and thus adjust the position of the associated electrode relative to the turret. Once the electrode has been brought to a desired position, it can be locked in place with the associated set screw 98. If desired, control means 200 may incorporate manually operable means for releasing the turret arrest means and/or operating turret rotation actuator 108 so that each electrode can be brought to workpiece engaging disposition at will during the reloading and setting operation. Thus, the operator can verify proper engagement of each electrode with the workpieces during the setting-up process. Typically, ground electrode 190 can be replaced by a new ground electrode which is fastened to ground electrode support 138, without any further adjustment. If desired, the timing of the engagement between the ground electrode and the workpiece can be altered by adjusting the stops associated with links 154 and 166 upwardly or downwardly to vary the lowermost position of the links, and hence of the link cross shaft, relative to the carriage. Thus, stop 160 associated with link 154 (FIG. 1) and the similar stop (not shown) associated with link 166 can be adjusted downwardly from the position illustrated so that the link cross shaft 176, in its lowermost position, is slightly lower than the position illustrated. The force of engagement between the ground electrode and the workpiece can be adjusted by turning bushings 168 and 172 to vary the preload on springs 170 and 174.

Figure 7:
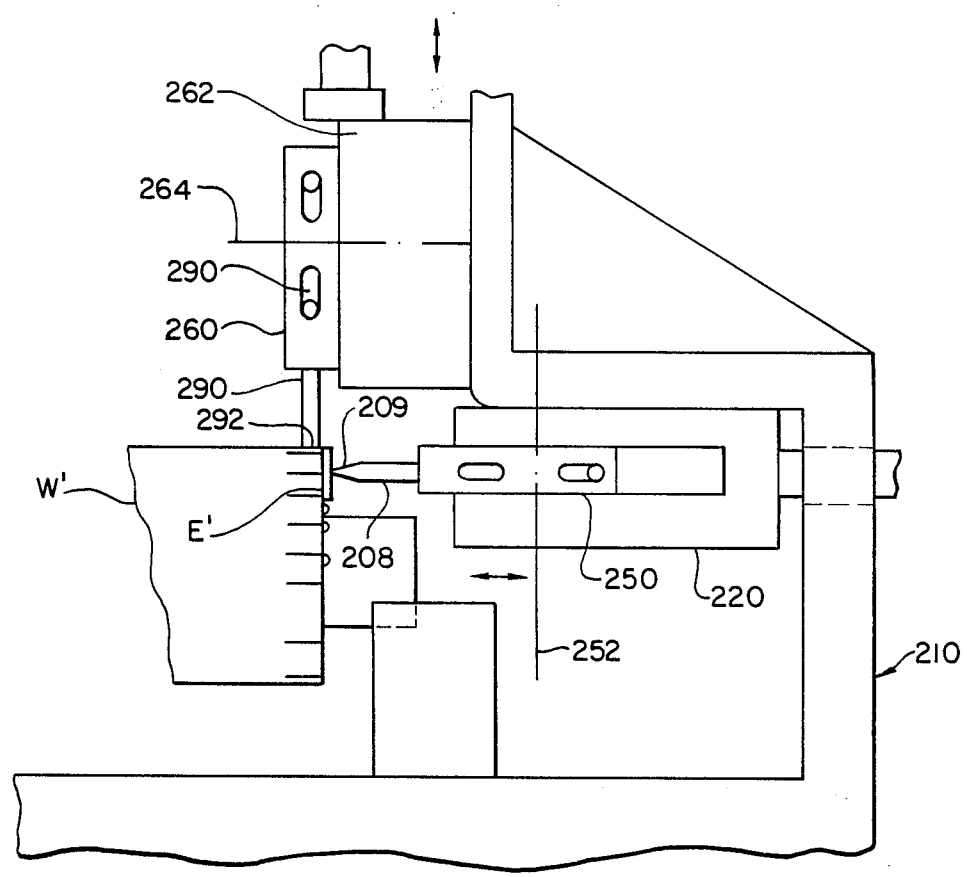
FIG. 7 is a view similar to FIG. 1 but depicting apparatus according to a further embodiment of the invention.

The apparatus illustrated in FIG. 7 is generally similar to that discussed above. However, the turret 250 carrying the fusing electrodes 208 is mounted for rotation about a turret axis 252 which extends vertically. Fusing electrode turret 250 is carried on a carriage 220 which is mounted to the base 210 for forward and rearward movement, transverse to axis 252. The ground electrode holder includes a turret 260 mounted to a further carriage 262. Turret 260 is rotatable about a horizontal turret axis 264, and carriage 262 is movable upwardly and downwardly with respect to base 210. Turrets 250 and 260 are similar to construction to the turret 50 used in the embodiment of FIGS. 1-6. Appropriate means for rotating and locking each turret (now shown) are also provided, these being generally similar to the corresponding components employed in FIGS. 1-6.

The apparatus of FIG. 7 employs a plurality of separate, rod-like ground electrodes, each defining a separate ground contact region, rather than the unitary blade-like electrode used in the embodiment FIGS. 1-6. Thus, the operations involved in changing ground contact regions with the FIG. 7 embodiment are similar to those used for changing fusing contact regions in the embodiment of FIGS. 1-6. Also, as the fusing electrode holder or turret 250 moves forwardly and rearwardly with respect to the base, the fusing contact region 209 facing toward the front of the device is in workpiece-engaging disposition, and can engage a wire end E' on a vertical face of a workpiece W'. This arrangement is particularly useful in processing certain forms of rotor workpieces requiring fusion on an end face, rather than on a circumferential surface.

As will be readily appreciated, numerous variations and combinations of the features described above may be employed without departing from the broad scope of the present invention as defined in the claims. Merely by way of example, the separate counters 202 and 204 employed to keep separate ground electrode and fusing electrode engagement counts can be replaced by a single counter keeping a single electrode engagement count. In this arrangement, both the fusing and ground electrode holders are shifted when the single count reaches a predetermined maximum. In FIG. 7, the bladelike ground electrode of FIG. 1 is replaced by a plurality of tipped electrodes disposed in a turret; conversely, the turret arrangement used for holding the fusing electrodes could be replaced by a linearly-movable arrangement as employed for holding the ground electrode in FIG. 1. As these and other variations and combinations can be employed, the foregoing description of the preferred embodiments should be taken by way of illustration rather than by way of limitation of the present invention as defined in the claims.

What is claimed is:

1. Fusing apparatus comprising: a fusing electrode holder means and ground electrode holder means for holding fusing and ground electrodes defining fusing and ground contact regions, respectively, at least one of said fusing and ground electrode holder means being a multicontact electrode holder means operative to hold at least one electrode defining a plurality of contact regions;
   electrode positioning means for positioning each of said electrode holder means so that one said fusing contact region is presented in a workpiece engaging disposition and one said ground contact region is presented in a workpiece-engaging disposition;
   engagement means for repetitively engaging said fusing and ground contact regions in workpiece-engaging dispositions with successive workpieces;
   power means for directing electricity through the fusing and ground contact regions engaged with each workpiece so as to fuse elements of the workpiece to one another; and
   electrode change means for moving each said multicontact electrode holder means to thereby present a new contact region in workpiece engaging disposition;
   wherein one said multicontact electrode holder means includes a blade holder means for holding an electrode having an elongated edge and said electrode change means includes means for moving said blade holder means in a lengthwise direction of said edge to present a new region of said edge in workpiece-engaging disposition.

2. Apparatus as claimed in claim 1 further comprising a base defining upward, downward, forward, rearward and lateral directions, said blade holder means being operative to hold said electrode having an edge so that said edge extends laterally with respect to said base, said engagement means including means for fixing successive workpieces, each generally in the form of a body of revolution about an axis, so that each workpiece is disposed on said base beneath said edge and the axis of each workpiece extends forwardly and rearwardly along a predetermined line, said engagement means also including means for moving said blade holder means downwardly relative to said base to contact each workpiece and upwardly relative to said base away from each workpiece, said electrode change means including means for moving said blade holder means laterally relative to said base to thereby align a new region of said edge with said predetermined line for contact with said workpieces.

3. Apparatus as claimed in claim 2 wherein said ground electrode holder means includes said blade holder means, said engagement means includes a carriage mounted to said base for upward and downward movement relative thereto and carriage drive means for moving said carriage upwardly and downwardly, said fusing electrode holder means being mounted to said carriage so that the fusing contact surface region in workpiece-engaging disposition faces downwardly, said engagement means also including ground electrode linkage means for linking said blade holder means to said carriage for upward and downward movement therewith relative to said base, said blade holder means also being movable upwardly and downwardly relative to said carriage over a limited range of motion between an upper and lower position, said engagement means also including ground electrode bias means for biasing said blade holder means towards said lower position.

4. Apparatus as claimed in claim 3 wherein said blade holder means includes a ground electrode support mounted to said base for pivotal movement about a base pivot axis and said ground electrode linkage means includes a link mounted to the carriage for upward and downward movement relative thereto, said ground electrode support being pivotally connected to said link at a link pivot axis parallel to said base pivot axis, said ground electrode bias means including means for biasing said link downwardly relative to said carriage and stop means for limiting downward motion of said link relative to said carriage.

5. Apparatus as claimed in claim 4 wherein said electrode change means includes means for shifting said ground electrode support laterally with respect to said carriage and said base.

6. Apparatus as claimed in claim 5 wherein said base pivot axis and said link pivot axis extend laterally, said ground electrode support being slideably connected to said base and said link at said base and link pivot axes, respectively, for lateral movement relative to said base and said link.

7. Apparatus as claimed in claim 6 wherein said ground electrode linkage means includes a link cross shaft mounted to said link and extending laterally at said link pivot axis, said ground electrode support being slideably and pivotally connected to said link cross shaft.

8. Apparatus as claimed in claim 7 wherein said link cross shaft is movable forwardly and rearwardly relative to said link.

9. Apparatus as claimed in claim 7 wherein said ground electrode linkage means includes a rod slideably mounted to said base on said base pivot axis, said ground electrode support being connected to said rod for lateral movement therewith, said electrode change means including means for moving said rod laterally.

10. Apparatus as claimed in claim 9 further comprising insulating bushings surrounding said rod and said link cross shaft and electrically insulating said ground electrode support therefrom, and a flexible ground connector attached to said ground electrode support adjacent said base pivot axis.

11. Apparatus as claimed in claim 9 wherein said ground electrode support is pivotable about said rod.

* * * * *